United States Patent
Radhakrishnan et al.

(10) Patent No.: US 12,210,621 B2
(45) Date of Patent: Jan. 28, 2025

(54) SYSTEM AND METHOD TO AUTOMATICALLY CONSTRUCT KILL-CHAIN FROM SECURITY ALERT

(71) Applicant: salesforce.com, inc., San Francisco, CA (US)

(72) Inventors: Regunathan Radhakrishnan, San Francisco, CA (US); Vijay Erramilli, San Francisco, CA (US); Anirudh Kondaveeti, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 418 days.

(21) Appl. No.: 17/578,670

(22) Filed: Jan. 19, 2022

(65) Prior Publication Data
US 2023/0229763 A1    Jul. 20, 2023

(51) Int. Cl.
*G06F 21/55* (2013.01)
*G06N 3/08* (2023.01)

(52) U.S. Cl.
CPC .......... *G06F 21/554* (2013.01); *G06N 3/08* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2020/0314118 A1* | 10/2020 | Levin | H04L 63/1425 |
| 2020/0327224 A1* | 10/2020 | Tyagi | G06F 21/554 |
| 2020/0336506 A1* | 10/2020 | Levin | G06F 40/30 |

* cited by examiner

*Primary Examiner* — Syed A Roni
(74) *Attorney, Agent, or Firm* — Butzel Long (57) ABSTRACT

Methods, computer readable media, and devices to automatically construct kill-chain from security alerts are disclosed. One method may include collecting a plurality of security alerts, receiving a selection of a high severity security alert associated with a node and a user from among the plurality of security alerts, creating a security narrative for the high severity security alert by providing a set of historical security alerts to a deep learning architecture, the set including security alerts selected based on a relation to the node and the user, and identifying a subset of the set of historical security alerts, including security alerts relevant to the high severity security alert, in a reverse time order by the deep learning architecture, and providing the security narrative as part of a response to the high severity security alert.

18 Claims, 5 Drawing Sheets

SYSTEM AND METHOD TO AUTOMATICALLY CONSTRUCT KILL-CHAIN FROM SECURITY ALERT

TECHNICAL FIELD

Embodiments disclosed herein relate to utilizing machine learning to automatically stitch together multiple relevant security alerts from an end-point in a reverse time order to reduce incident response time.

BACKGROUND

A large modern enterprise may consist of hundreds of thousands of end-point devices, such as laptops, mobile devices, servers, infrastructure, and the like, that at any point in time may be targeted by malicious parties for various reasons. In order to secure these devices, and hence the entire organization, a typical approach is to install multiple security products, often from a variety of vendors, that protect against different types of attacks. These security products installed on end-point devices raise alerts every time they sense something suspicious and the collection of all of these alerts are normally sent to security operations centers (SOCs) where they are investigated by security analysts to identify real and possibly ongoing security incidents. These alerts can be of differing severity levels and are often too numerous. For a security analyst, to be able to sift through thousands of these alerts manually and construct a security narrative, and determine if there is indeed an ongoing security incident and if containment/mitigation strategies may be needed to be deployed, may be a very taxing and daunting task. This may often lead to alert fatigue among analysts, and the repurcussions may include unresolved alerts/incidents and lowering of the organization's security posture.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques and systems for utilizing a deep learning architecture such as long short term memory (LSTM) to learn from historical security alerts and, in response to a high severity alert, construct a time-line of relevant alerts in an automated manner to form a kill-chain or narrative of causal chain for a possible security incident/attack. In particular, disclosed embodiments may enable automatic construction of a security narrative presenting a collection of security alerts relevant to a single alert. Such automatic construction of kill-chain may minimize alert fatigue by security analysts and further enhance security of an organization.

Of note, in a typical implementation of LSTM, a future word/state may be predicted. In various implementations of the disclosed subject matter, LSTM may be utilized in a reverse time order such that, given a current state (i.e., a high severity security alert), the architecture may identify relevant security alerts from progressively earlier time slots.

In one example, a security analyst may be presented with a number of security alerts that range in severity and the security analyst may select a high severity security alert from the presented alerts. The selected high severity security alert, although identified as high severity, may or may not actually represent a security incident that would otherwise prompt further investigation and/or action.

In a traditional approach, the security analyst may identify a particular end-point device and a particular end-user associated with the high severity security alert and then identify any other security alerts associated with the end-point device and end-user for a particular historical time period. Then, based on the security analysts' own experience, the analyst would sort through all of the historical security alerts to identify alerts relevant to the high severity security alert. Finally, the security analyst would piece together the relevant historical alerts and the high severity security alert to form a security narrative indicating whether or not the high severity security alert in fact is indicative of a security incident that requires further action. Only after the security analyst has decided that the high severity security alert is indicative of a security incident based on the security narrative would any mitigation or other action be taken. This traditional approach is very time intensive and relies heavily on the individual expertise and ability to respond in a timely fashion by the security analyst.

In various implementations of the disclosed subject matter, a deep learning architecture, such as LSTM, may be utilized to automatically create a security narrative associated with the selected high severity security alert. For example, a system may identify at least one user and at least one end-point device associated with the selected high severity security alert. The identified at least one end-point device and at least one end user as well as a collection of historical security alerts associated with the end-point device and/or end user may be provided to a deep learning architecture. The deep learning architecture may process the inputs and generate a subset of historical security alerts that are relevant to the selected high severity security alert. The subset of historical security alerts may be presented to the security analyst as a kill-chain or security narrative. At this point, the security analyst may only need to review the kill-chain to validate the security narrative and initiate any appropriate action.

Implementations of the disclosed subject matter provide methods, computer readable media, and devices to automatically construct kill-chain security narrative from security alerts. In various implementations, a method may include collecting a plurality of security alerts, receiving, via a graphical user interface, a selection of a high severity security alert from among the plurality of security alerts, creating a security narrative for the high severity security alert, and providing, via the graphical user interface, the security narrative as part of a response to the high severity security alert. In some implementations, the high severity security alert may be associated with at least one node and at least one user. In some implementations, the security narrative may be created by providing, to a deep learning architecture, a set of historical security alerts including security alerts selected from the plurality of security alerts based on a relation to the at least one node and the at least one user associated with the high severity security alert and identifying, by the deep learning architecture and in a reverse time order, a subset of the set of historical security alerts including security alerts relevant to the high severity security alert.

In some implementations, the method may include training the deep learning architecture by providing, to the deep learning architecture, a plurality of historical security alerts and a plurality of historical narratives associated with the plurality of historical security alerts.

In some implementations, the deep learning architecture may include a long short term memory cell.

In some implementations, the set of historical security alerts may include security alerts from a plurality of time slots, with a time slot being associated with a varying number of security alerts and the deep learning architecture may include a plurality of cells with a cell being associated with one of the plurality of time slots.

In some implementations, providing, to the deep learning architecture, the set of historical security alerts may include providing, in reverse time order, the set of historical security alerts such that a varying number of security alerts associated with a time slot are provided to an associated cell.

In some implementations, identifying, by the deep learning architecture and in reverse time order, a subset of the set of historical security alerts may include, for at least one cell, determining whether zero or more historical security alerts for a time slot associated with the at least one cell are relevant to the high severity security alert and providing the zero or more historical security alerts as output of the at least one cell for inclusion in the subset of the set of historical security alerts.

Figure 1A:
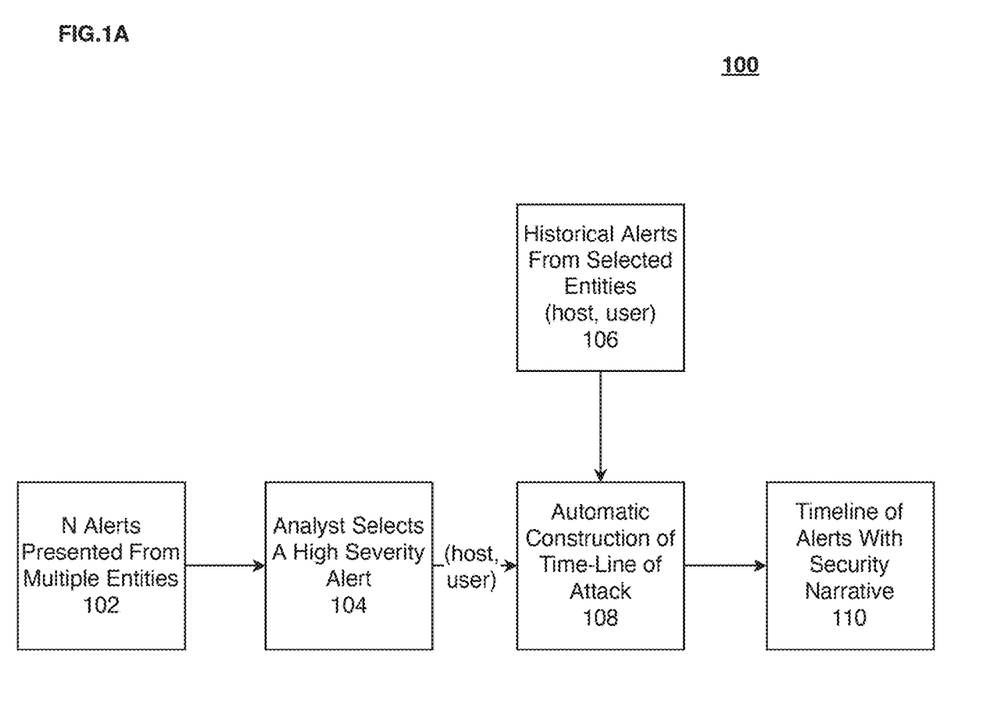
FIG. 1A is a block diagram illustrating a system to automatically construct kill-chain from security alerts according to some example implementations.

FIG. 1A illustrates a system 100 to automatically construct kill-chain from security alerts according to various implementations of the subject matter disclosed herein. In various implementations, system 100 may include, for example, N alerts being presented from multiple entities 102, selection of a high severity alert 104, historical alerts from selected entities 106, automatic construction of time-line of attack 108, and timeline of alerts with security narrative 110. In one example, N alerts being presented from multiple entities 102 may include presenting a number of security alerts with varying severity from a number of end-point devices and/or related to a number of end users. The N alerts may be presented, for example, via a graphical user interface (GUI). Selection of a high severity alert 104 may, for example, be by a security analyst. For example, the security analyst may select the high severity alert from the N alerts presented via the GUI. Of note, the high severity alert may be associated with at least one end-point device and at least one user. Based on this association, historical alerts from selected entities 106 may include, for example, any historical security alerts associated with the at least one end-point device and the at least one user. That is, the selected entities are the at least one end-point device and the at least one user associated with the high severity security alert and the historical security alerts are historical alerts associated with those entities.

In this example, automatic construction of a time-line of attack 108 may include generating a timeline based on the selected high severity security alert and the historical alerts associated with the selected entities. Such automatic construction may utilize a deep learning architecture, such as long short term memory, to identify, in a reverse time order, historical alerts that are relevant to the high severity security alert selected by the analyst. Timeline of alerts with security narrative 110 may include, for example, the relevant historical alerts identified by the deep learning architecture.

Figure 1B:
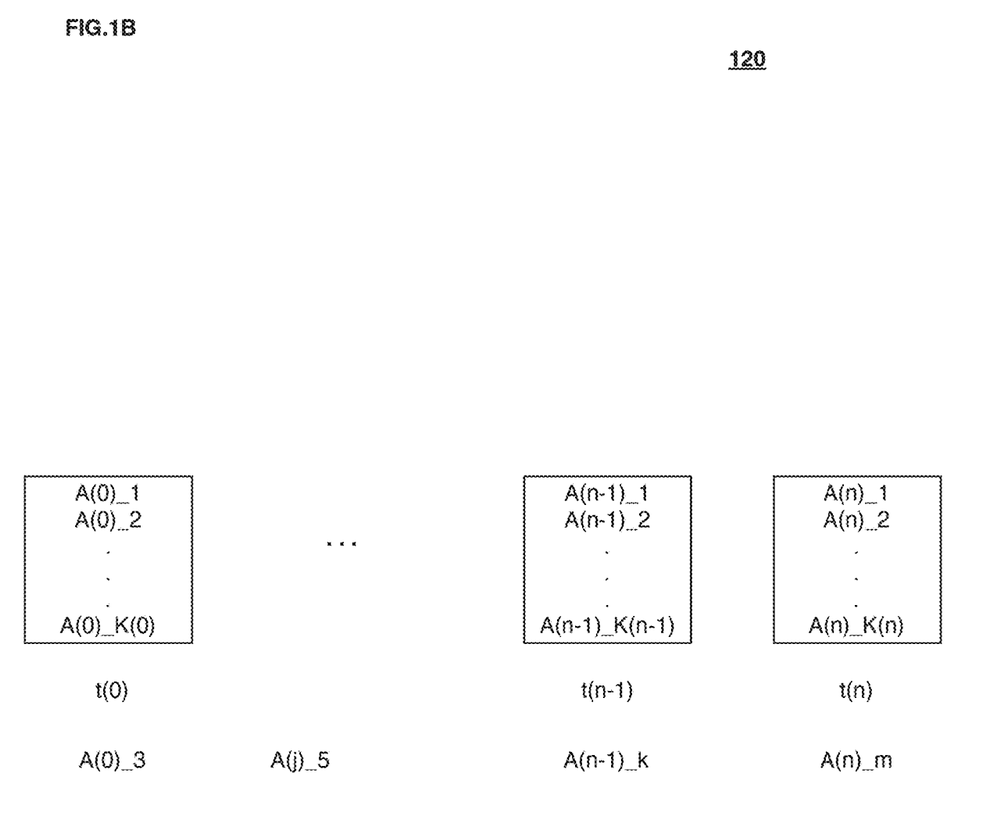
FIG. 1B is a block diagram illustrating a timeline of collections of security alerts and security alerts relevant to an incident according to some example implementations.

FIG. 1B illustrates a timeline 120 of collections of security alerts and security alerts relevant to an incident according to various implementations of the subject matter disclosed herein. For example, at time step t(n) a security analyst may have received or otherwise selected a high severity security alert $A(n)\_m$ from an end-point device. In various implementations, relevant security alerts, such as $A(n-1)\_k$ at $t(n-1)$, $A(j)\_5$ at $t(j)$, and $A(0)\_3$ at $t(0)$, need to be identified in order to create a security narrative or kill-chain associated with high severity alert $A(n)\_m$. In various implementations, the relevant security alerts may be identified from among a plurality of alerts at each time step, such as $A(n)\_1$, $A(n)\_2$, ... $A(n)\_K(n)$ at $t(n)$; $A(n-1)\_1$, $A(n-1)\_2$, ..., $A(n-1)\_K(n-1)$ at $t(n-1)$; and $A(0)\_1$, $A(0)\_2$, ..., $A(0)\_K(0)$.

Figure 1C:
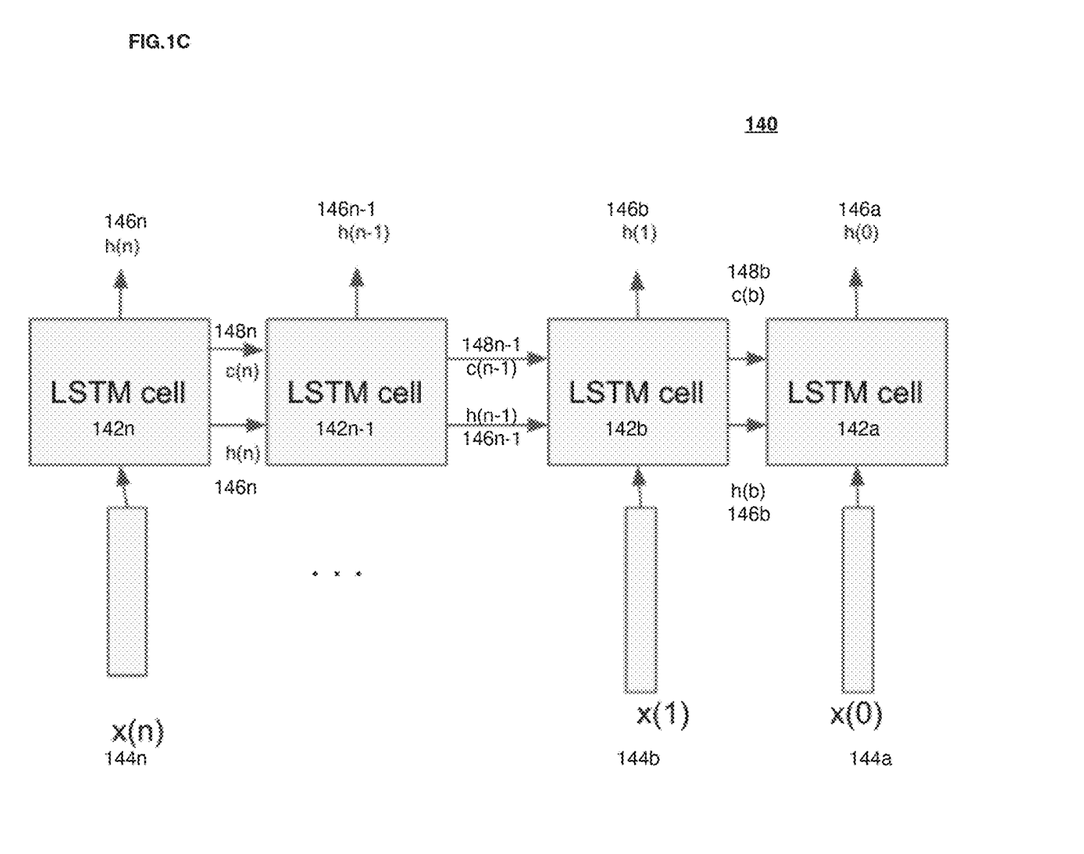
FIG. 1C is a block diagram illustrating a neural network architecture to automatically construct kill-chain from security alerts according to some example implementations.

FIG. 1C illustrates a neural network architecture 140 to automatically construct kill-chain for a security alert according to various implementations of the subject matter disclosed herein. In various implementations, neural network architecture 140 may include, for example, a series of long short term memory (LSTM) cells 142a, 142b, ..., 142n-1, 142n. An LSTM cell may, for example, relate to a time slot and the series of LSTM cells may relate to an overall time period covering an amount of time prior to and including when a selected high severity security alert occurred.

Input to an LSTM cell may be structured as a vector, such as vector $x(0)$ 144a for LSTM cell 142a, vector $x(1)$ 144b for LSTM cell 142b, and vector $x(n)$ 144n for LSTM cell 142n. An input vector may include, for example, a collection of historical security alerts for a time slot associated with the related LSTM cell. For example, LSTM cell 142a may be associated with time slot $t(n)$ and input vector $x(0)$ may include historical security alerts that occurred during time slot $t(n)$ while LSTM cell 142n may be associated with time slot $t(0)$ and input vector $x(n)$ may include historical security alerts that occurred during time slot $t(0)$. In some implementations, a collection of historical security alerts may include security alerts related to at least one end-point device and at least one end user associated with a selected high severity security alert. In some implementations, an input vector may be structured as a one-hot encoding of the collection of historical security alerts included in the input vector. For example, if there are K different types of alerts, an input vector may be a K dimensional vector and such K dimensional vector may have a 1 in a dimension associated with an alert and a 0 in a dimension not associated with an alert. In a particular example, if, for time slot t(i), alerts of alert type 0 and alert type K-1 were both triggered, then the input vector x(i) may be {1,0,0, . . . 1,0}.

An LSTM cell may process an input vector and generate an output vector h and a cell state vector c. For example, LSTM cell 142*n* may process input vector x(n) 144*n* and generate output vector h(n) 146*n* and cell state vector c(n) 148*n*. Similarly, LSTM cell 142*b* may process input vector x(l) 144*b* and generate output vector h(b) 146*b* and cell state c(b) 148*b*. Of note, the output vector h and the cell state vector c are passed to the subsequent LSTM cell and such subsequent LSTM cell may utilize these vectors as additional inputs. For example, LSTM cell 142*n*-1 may utilize output vector h(n) 146*n* and cell state vector c(n) 148*n* as additional inputs. Of note, an output vector h may represent a one-hot encoding of historical security alerts for a time slot that are relevant to a selected high severity security alert. That is, while an input vector x represents a one-hot encoding of all historical security alerts related to at least one end-point device and at least one end user for a time slot, an output vector h represents a one-hot encoding of only those historical security alerts for the time slot that are relevant to the selected high severity security alert.

In various implementations, an LSTM cell may include the following:

$$f_t = \sigma(W_f \cdot [h_{t-1}, x_t] + b_f)$$

$$i_t = \sigma(W_i \cdot [h_{t-1}, x_t] + b_i)$$

$$\overline{C}_t = \tanh(W_c \cdot [h_{t-1}, x_t] + b_c)$$

$$C_t = f_t * C_{t-1} + i_t * \overline{C}_t$$

$$o_t = \sigma(W_o \cdot [h_{t-1}, x_t] + b_0)$$

$$h_t = o_t * \tanh(C_t)$$

where the layer $f_t$ (forget gate layer) provides the ability to forget patterns from the past, the layer $i_t$ (input gate layer) provides the ability to update the memory cell with new information, the layer $o_t$ (output layer) is a combination of past LSTM state $h_{t-1}$ and $x_t$, and the output $h_t$ is a combination of $o_t$ and $C_t$.

In various implementations, neural network architecture 140 may be trained with labeled training examples from past historical incident investigations. For example, if alert A(0)_3 from time t(0) is relevant to the sequence of events that led to a high severity security alert at t(n), then the output of the LSTM cell at t(0) (i.e., h(0)) would encode this by having a 1 along that dimension. Similarly, if none of the alerts at time step t(k) are relevant, then h(k) would be all zeros. If a particular time step has multiple alerts relevant to the multi-kill chain story, then the output for that LSTM cell will have multiple l's along appropriate dimensions. With this type of labeled data, this LSTM-based architecture may be trained to learn the various patterns in attacker kill-chains from past historical data.

Given a trained model, such as neural network architecture 140 of FIG. 1C, and all the alerts that occurred at different time steps from t(n) to t(0), then this model's output from each LSTM state (i.e., h(t)), may be used to create a complete time-line of the attack. By scoring all the alerts using this trained model, a security analyst may be provided the ability to reduce an incident response time by providing a complete time-line of relevant alerts from the past for the flagged incident at t(n).

Figure 2:
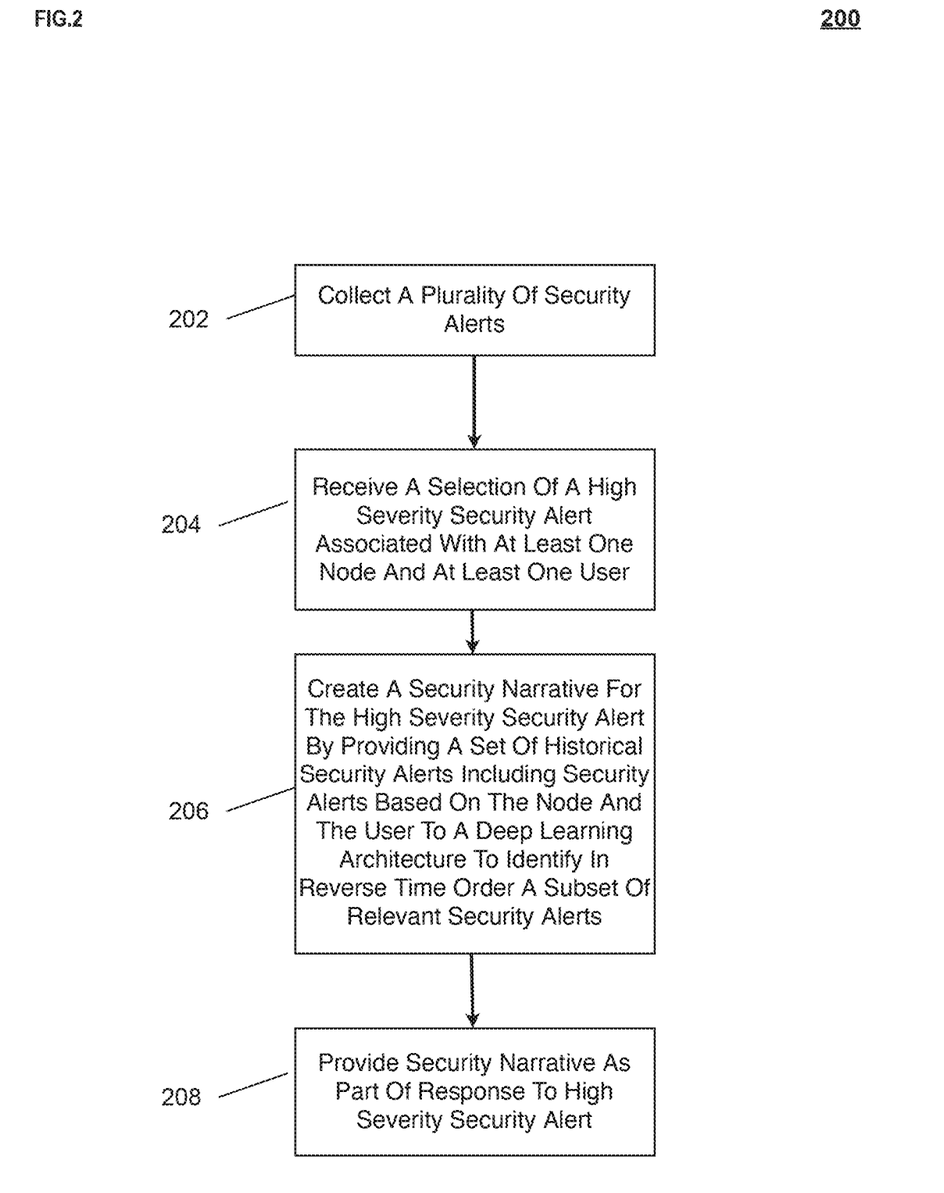
FIG. 2 is a flow diagram illustrating a method to automatically construct kill-chain from security alerts according to some example implementations.

FIG. 2 illustrates a method 200 to automatically construct kill-chain from security alerts, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a plurality of security alerts may be collected. In various implementations, the plurality of security alerts may be collected from a variety of security mechanisms and may have varied severity. A security alert may, for example, relate to an end-point device and/or a user.

In step 204, a selection of a high severity security alert associated with at least one node and at least one user may be received. In various implementations, the collected plurality of security alerts may be presented to a security analyst via a graphical user interface and the security analyst may select a high severity security alert from the presented collection. In some implementations, the high severity security alert may be associated with at least one node and at least one user.

In step 206, a security narrative for the high severity security alert may be created by providing a set of historical security alerts including security alerts based on the node and the user to a deep learning architecture to identify in reverse time order a subset of relevant security alerts. In various implementations, the deep learning architecture may be based on or otherwise include a series of long short term memory (LSTM) cells. In some implementations, the set of historical security alerts may include security alerts generated by the at least one node and/or based on a relation to the at least one user. The identified subset of relevant security alerts may include, for example, security alerts relevant to the high severity security alert.

In step 208, a security narrative may be provided as part of a response to the high severity security alert. In various implementations, the identified subset of relevant security alerts may, for example, be provided to a security analyst via a graphical user interface. The identified subset of relevant security alerts may, for example, represent a kill-chain or security narrative associated with the high severity security alert. Based on this kill-chain, the security analyst may determine whether to take additional action related to the high severity security alert.

In this way, an organization's security posture may be enhanced by facilitating improved analysis of security incidents by security analysts.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
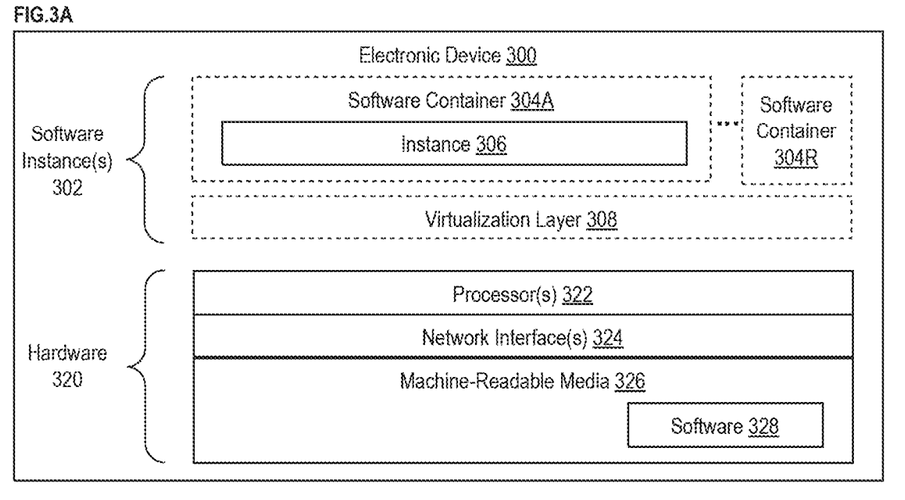
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
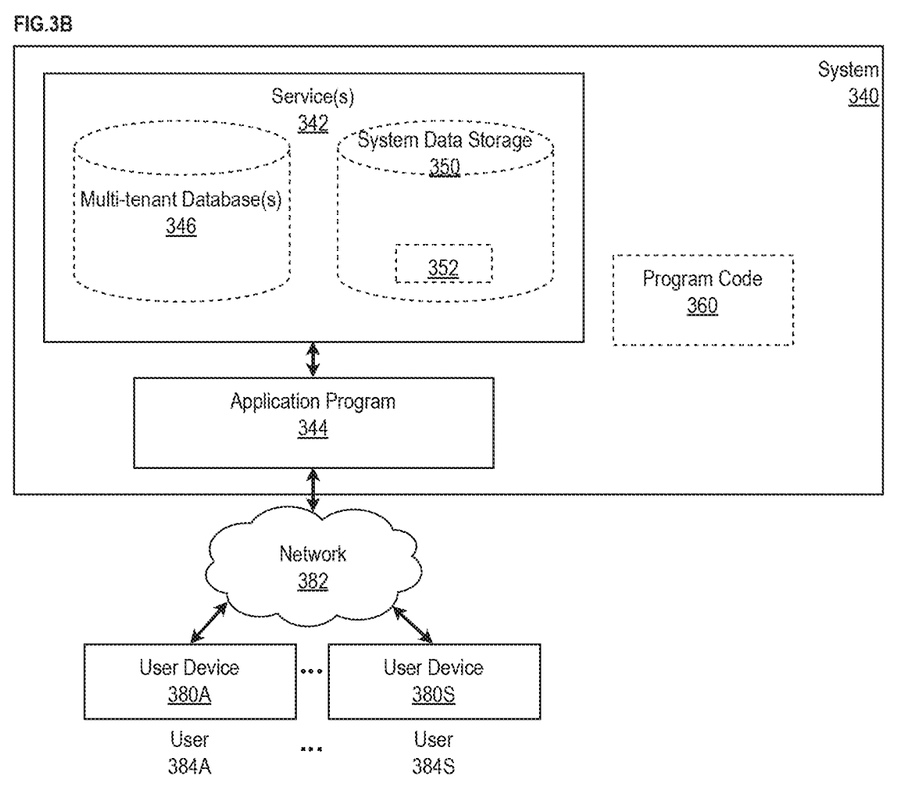
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different depai intents/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:
   collecting a plurality of security alerts;
   receiving, via a graphical user interface, a selection of a high severity security alert from among the plurality of security alerts, the high severity security alert associated with at least one node and at least one user;
   creating, for the high severity security alert, a security narrative by:
      providing, to a deep learning architecture, a set of historical security alerts comprising security alerts selected from the plurality of security alerts based on a relation to the at least one node and the at least one user associated with the high severity security alert; and
      identifying, by the deep learning architecture and in a reverse time order from progressively earlier time slots, a subset of the set of historical security alerts, the subset comprising security alerts relevant to the high severity security alert; and
   providing, via the graphical user interface, the security narrative as part of a response to the high severity security alert.

2. The computer-implemented method of claim 1, further comprising training the deep learning architecture by providing, to the deep learning architecture, a plurality of historical security alerts and a plurality of historical narratives associated with the plurality of historical security alerts.

3. The computer-implemented method of claim 1, wherein the deep learning architecture comprises a long short term memory cell.

4. The computer-implemented method of claim 1, wherein:
   the set of historical security alerts comprises security alerts from a plurality of time slots wherein a time slot is associated with a varying number of security alerts; and
   the deep learning architecture comprises a plurality of cells wherein a cell is associated with one of the plurality of time slots.

5. The computer-implemented method of claim 4, wherein providing, to the deep learning architecture, the set of historical security alerts comprises providing, in reverse time order, the set of historical security alerts such that a varying number of security alerts associated with a time slot are provided to an associated cell.

6. The computer-implemented method of claim 4, wherein identifying, by the deep learning architecture and in a reverse time order, a subset of the set of historical security alerts comprises, for at least one cell:
   determining whether zero or more historical security alerts for a time slot associated with the at least one cell are relevant to the high severity security alert; and
   providing the zero or more historical security alerts as output of the at least one cell for inclusion in the subset of the set of historical security alerts.

7. A non-transitory machine-readable storage medium that provides instructions that, if executed by a processor, are configurable to cause the processor to perform operations comprising:
   collecting a plurality of security alerts;
   receiving, via a graphical user interface, a selection of a high severity security alert from among the plurality of security alerts, the high severity security alert associated with at least one node and at least one user;
   creating, for the high severity security alert, a security narrative by:
      providing, to a deep learning architecture, a set of historical security alerts comprising security alerts selected from the plurality of security alerts based on a relation to the at least one node and the at least one user associated with the high severity security alert; and
      identifying, by the deep learning architecture and in a reverse time order from progressively earlier time slots, a subset of the set of historical security alerts, the subset comprising security alerts relevant to the high severity security alert; and
   providing, via the graphical user interface, the security narrative as part of a response to the high severity security alert.

8. The non-transitory machine-readable storage medium of claim 7, wherein the operations further comprise training the deep learning architecture by providing, to the deep learning architecture, a plurality of historical security alerts and a plurality of historical narratives associated with the plurality of historical security alerts.

9. The non-transitory machine-readable storage medium of claim 7, wherein the deep learning architecture comprises a long short term memory cell.

10. The non-transitory machine-readable storage medium of claim 7, wherein:
    the set of historical security alerts comprises security alerts from a plurality of time slots wherein a time slot is associated with a varying number of security alerts; and
    the deep learning architecture comprises a plurality of cells wherein a cell is associated with one of the plurality of time slots.

11. The non-transitory machine-readable storage medium of claim 10,
    wherein providing, to the deep learning architecture, the set of historical security alerts comprises providing, in reverse time order, the set of historical security alerts such that a varying number of security alerts associated with a time slot are provided to an associated cell.

12. The non-transitory machine-readable storage medium of claim 10,
    wherein identifying, by the deep learning architecture and in a reverse time order, a subset of the set of historical security alerts comprises, for at least one cell:
       determining whether zero or more historical security alerts for a time slot associated with the at least one cell are relevant to the high severity security alert; and
       providing the zero or more historical security alerts as output of the at least one cell for inclusion in the subset of the set of historical security alerts.

13. An apparatus comprising:
    a processor; and
    a non-transitory machine-readable storage medium that provides instructions that, if executed by a processor, are configurable to cause the processor to perform operations comprising:
       collecting a plurality of security alerts;
       receiving, via a graphical user interface, a selection of a high severity security alert from among the plurality of security alerts, the high severity security alert associated with at least one node and at least one user;

creating, for the high severity security alert, a security narrative by:

provided, to a deep learning architecture, a set of historical security alerts comprising security alerts selected from the plurality of security alerts based on a relation to the at least one node and the at least one user associated with the high severity security alert; and identifying, by the deep learning architecture and in a reverse time order from progressively earlier time slots, a subset of the set of historical security alerts, the subset comprising security alerts relevant to the high severity security alert; and providing, via the graphical user interface, the security narrative as part of a response to the high severity security alert.

14. The apparatus of claim 13, wherein the operations further comprise training the deep learning architecture by providing, to the deep learning architecture, a plurality of historical security alerts and a plurality of historical narratives associated with the plurality of historical security alerts.

15. The apparatus of claim 13, wherein the deep learning architecture comprises a long short term memory cell.

16. The apparatus of claim 13, wherein:
the set of historical security alerts comprises security alerts from a plurality of time slots wherein a time slot is associated with a varying number of security alerts; and
the deep learning architecture comprises a plurality of cells wherein a cell is associated with one of the plurality of time slots.

17. The apparatus of claim 16, wherein providing, to the deep learning architecture, the set of historical security alerts comprises providing, in reverse time order, the set of historical security alerts such that a varying number of security alerts associated with a time slot are provided to an associated cell.

18. The apparatus of claim 16, wherein identifying, by the deep learning architecture and in a reverse time order, a subset of the set of historical security alerts comprises, for at least one cell:
determining whether zero or more historical security alerts for a time slot associated with the at least one cell are relevant to the high severity security alert; and
providing the zero or more historical security alerts as output of the at least one cell for inclusion in the subset of the set of historical security alerts.

* * * * *